United States Patent

Grobecker et al.

[11] Patent Number: 5,855,273
[45] Date of Patent: Jan. 5, 1999

[54] HOUSING WITH A RETAINING DEVICE ARRANGED ON A BASE PLATE

[75] Inventors: Hermann Grobecker, Garbsen; Henning Wilhelm, Lehrte/Aligse, both of Germany

[73] Assignee: U.S. Philips Corporation, New York, N.Y.

[21] Appl. No.: 856,457

[22] Filed: May 14, 1997

[30] Foreign Application Priority Data

Jul. 14, 1996 [DE] Germany .................. 196 26 925.3

[51] Int. Cl.$^6$ .................................................. B65D 85/57
[52] U.S. Cl. .................. 206/310; 206/308.1; 206/493
[58] Field of Search ........................... 206/308.1, 309, 206/310, 312, 493

[56] References Cited

U.S. PATENT DOCUMENTS

| 5,417,324 | 5/1995 | Joyce et al. | 206/310 |
| 5,494,156 | 2/1996 | Nies | 206/310 |
| 5,626,225 | 5/1997 | Joyce, Jr. | 206/308.1 |
| 5,660,274 | 8/1997 | Chien | 206/308.1 |
| 5,727,680 | 3/1998 | Liu | 206/308.1 |

FOREIGN PATENT DOCUMENTS

| 0114631B1 | 1/1984 | European Pat. Off. |
| 196008743 | 1/1996 | Germany |

*Primary Examiner*—Bryon P. Gehman
*Attorney, Agent, or Firm*—Michael E. Belk

[57] ABSTRACT

A housing with a retaining device is arranged on a base plate and comprises clamping studs which are arranged in a circle, which are radially resilient, and which have clamping surfaces facing radially outwards for gripping into a central opening of at least one disc-shaped information carrier, for example a CD. To avoid a destruction of the clamping elements in the case of impacts, rigid support studs with support surfaces facing radially outwards are provided between the clamping studs, and the diameter of the support surfaces arranged in a circle is somewhat smaller than the diameter of the central opening of the information carrier.

18 Claims, 3 Drawing Sheets

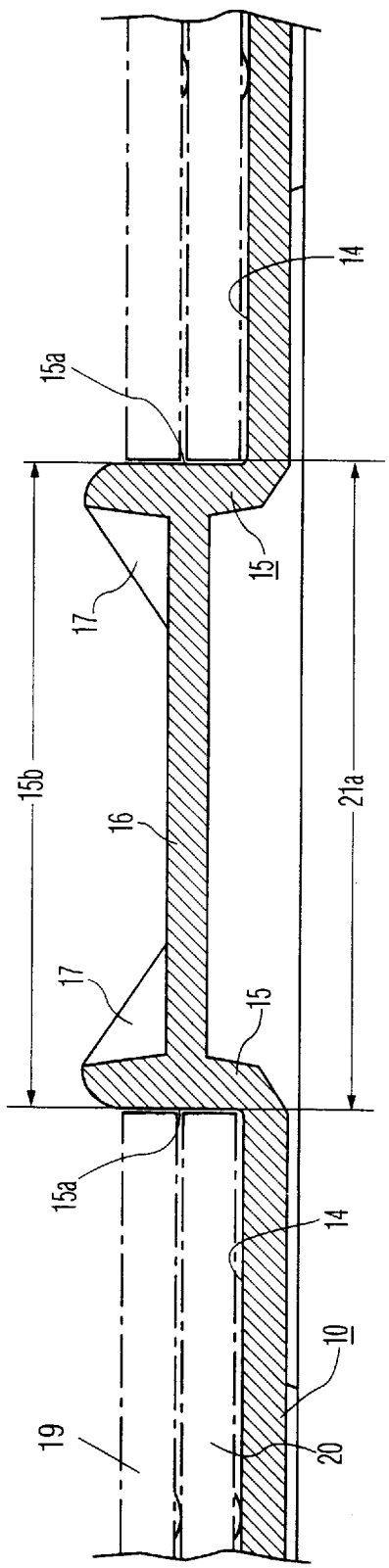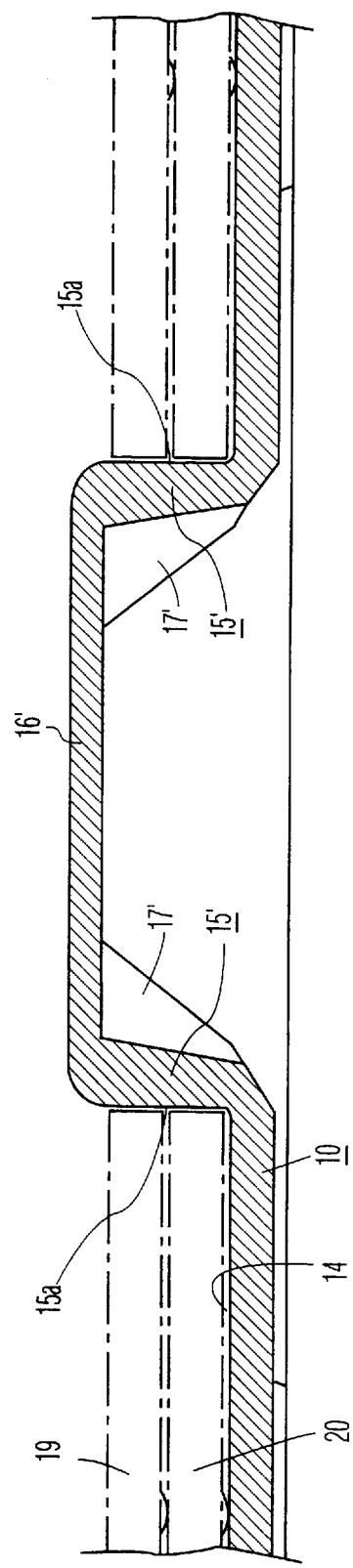

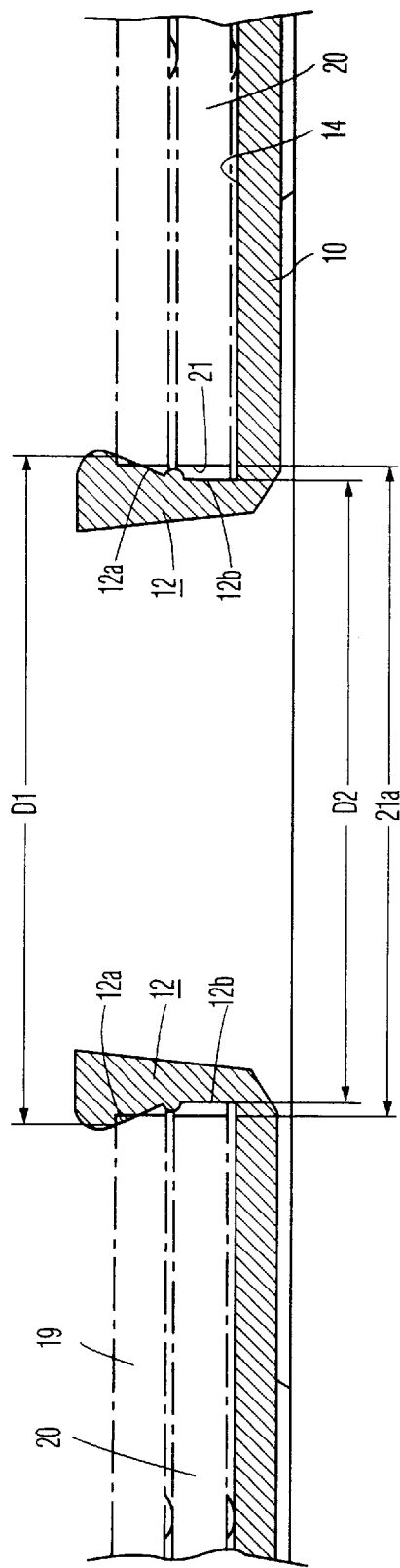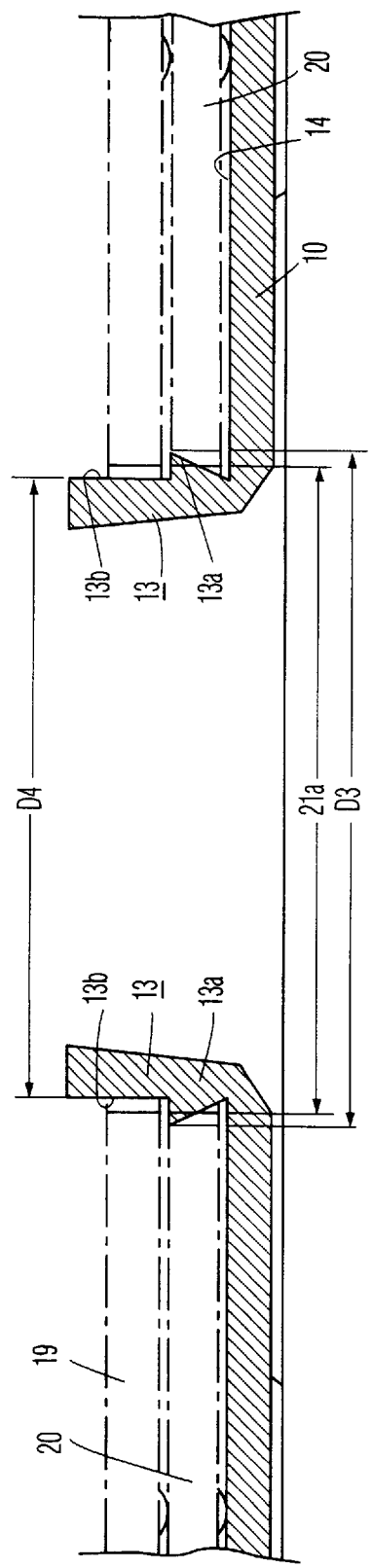

HOUSING WITH A RETAINING DEVICE ARRANGED ON A BASE PLATE

FIELD OF THE INVENTION

The invention relates to the field of housing for disc-shaped information carriers with central openings, such as a compact disks (CD's).

BACKGROUND OF THE INVENTION

A housing includes a retaining device which is arranged on a base plate and which comprises clamping studs which are arranged in a circle, which are radially resilient, and which have clamping surfaces facing radially outwards for gripping into a central opening of at least one disc-shaped information carrier, for example a CD.

Such a housing is known from, for example, EP-B 0 114 631. The known housing has a central part, two lid parts hinged thereto, and base plates which can be inserted into the central part and the lid parts and which are constructed as trays in the known example. The trays each have a retaining device projecting from the tray surface with clamping studs which are arranged in a circle, which are radially resilient, and which can enter a central opening of a compact disc to be clamped by the retaining device. In alternative housings of the kind mentioned in the opening paragraph without such a central part, a lid part is hinged to a bottom part comprising a tray, which tray is capable of accommodating one or several CDs (P 196 00 874.3).

It occurs frequently that the radially resilient clamping studs of the retaining device are broken in the case of strong impacts, in particular in those embodiments in which little material was used for reasons of economy and which accordingly have comparatively thin clamping studs. A secure retention of the CD, however, is no longer safeguarded the moment one or several such clamping studs have been broken.

The above citations are hereby incorporated in whole by reference.

SUMMARY OF THE INVENTION

The invention has for its object to provide a retaining device for housings of the kind mentioned in the opening paragraph in which no damage occurs to the clamping studs also in the case of major impacts.

According to the invention, this object is achieved in a housing of the kind mentioned in the opening paragraph in that rigid support studs with support surfaces facing radially outwards are provided between the clamping studs, and the diameter of the support surfaces arranged in a circle is somewhat smaller than the diameter of the central opening of the information carrier.

Such a construction ensures that the CD is now pressed with the edge of its central opening against the support surfaces of the support studs in the case of strong impacts, so that a mechanical loading of the clamping studs is avoided. The impact loads are accordingly accommodated by the rigid support studs, so that the danger of fracture of the clamping elements is avoided.

In an embodiment of the invention, the support studs extend at right angles to the plane of the base plate and project approximately up to the free-end region of the clamping studs. The perpendicular arrangement renders possible an optimum support for the information carrier in the case of impacts, and the arrangement up to the end region of the clamping studs ensures that a reliable shock absorption is ensured in every position.

In an embodiment of the invention, the support studs are fixedly connected to one another by a common rigid support element. The reliability is enhanced thereby, while in addition the support studs can be made thinner because the major forces of an impact are now accommodated by the rigid support element.

In a further embodiment of the invention, the support studs are connected to the support element at their free ends. The support studs are supported at both their ends in such a construction, whereas no support is provided in the central region. Such a construction gives good results when the retaining device is designed for only a single CD. Good results are also obtained in the case of an extended version of the retaining device, in which case, in a further embodiment of the invention, a stiffening rib may be provided at each connection point between the support element and one of the support studs.

An optimum construction for the invention is achieved in that, in a further embodiment of the invention, the support studs are connected in their respective central regions to the common support element. This construction is particularly favorable when, for example, two disc-shaped information carriers are accommodated by the retaining device. To avoid all risk of fracture also in this case, a reinforcement rib may be provided between the common support element and each individual support stud also above the support element in a further embodiment of the invention.

A particularly simple and inexpensive construction is obtained in that the support element and the support studs are constructed integrally with the retaining device and the base plate.

A further embodiment of the invention is characterized in that the common support element is constructed, for example, as a support plate or as a spoke wheel.

Particular advantages are obtained through the application of the invention to a retaining device which comprises at least two groups of different, independent clamping studs, each group having clamping surfaces arranged in a different plane for clamping an information carrier in each plane. A smaller number of clamping studs is obviously available for clamping an information carrier in housings which accommodate more than one information disc. If a commercially available clamping device comprises, for example, twelve clamping studs, only six clamping studs are available for each information carrier if the device contains two information carriers, and if it contains three information carriers in one housing there will only be four clamping studs per information carrier available.

Preferably, the support studs according to the invention should be arranged such that they alternate with the clamping studs, so that a clamping stud is always followed by a support stud and vice versa. In such a construction, there will be only six clamping studs present instead of the original twelve clamping studs, one support stud being present between every two clamping studs. This would provide the possibility of holding two information carriers by means of six clamping studs, each information carrier being retained by three clamping studs.

It is equally possible, for example, to distribute eight clamping studs over the circumference, in which case four clamping studs are available for retaining each information disc. Eight rigid support studs would then be equally distributed among the eight resilient clamping studs again.

If a housing is chosen in which at least two groups of independent clamping studs are provided, each group with clamping surfaces arranged in a different plane for clamping a relevant information carrier, an embodiment of the invention is characterized in that the clamping surfaces lying in their particular planes are constructed so as to taper towards the plane of the base plate, such that the greatest outer diameter of the clamping surfaces arranged in a circle is somewhat greater than the diameter of the central opening of the information discs, the surfaces of the clamping studs adjoining the relevant clamping surfaces extend at right angles to the plane of the base plate and have an outer diameter which is somewhat smaller than the diameter of the central opening of the information carrier, and the outer diameter of the support surfaces is equal to or somewhat smaller than the outer diameter of the perpendicular surfaces of the clamping studs in the case in which information carriers are retained.

Such a construction renders possible a secure retention of information carriers lying one above the other inside a housing.

The invention is used to advantage in a commercially available housing with a bottom part, a lid part hinged to the bottom part, and a tray which can be inserted into the bottom part, the tray being constructed as a base plate with the central retaining device while the exterior dimensions of the housing remain unchanged. An advantageous application of the invention is also possible in a construction where the bottom part is constructed as the base plate with a central retaining device, while the exterior dimensions of the housing remain the same. The retaining devices are provided with support studs and support elements constructed in accordance with the invention.

Finally, the invention may be used to advantage also in a commercially available housing with a central part, with two identical lid parts hinged thereto and with a tray which can be inserted into each of the lid parts, where the two trays are constructed as base plates each with a central retaining device, while the exterior dimensions of the housing remain unchanged. The retaining devices are provided with support studs and support elements constructed in accordance with the the invention in that case.

Those skilled in the art will understand the invention and additional objects and advantages of the invention by studying the description of preferred embodiments below with reference to the following drawings which illustrate every feature of the appended claims.

BRIEF DESCRIPTION OF THE DRAWINGS

FIG. 2 is a cross-section taken on the line II—Il in FIG. 1, FIG. 3 is a cross-section taken as in FIG. 2 through a modified version, FIG. 4 is a cross-section taken on the line IV—IV in FIG. 1, FIG. 5 is a cross-section taken on the line V—V in FIG. 1.

DETAILED DESCRIPTION OF THE PREFERRED EMBODIMENT

Figure 1:
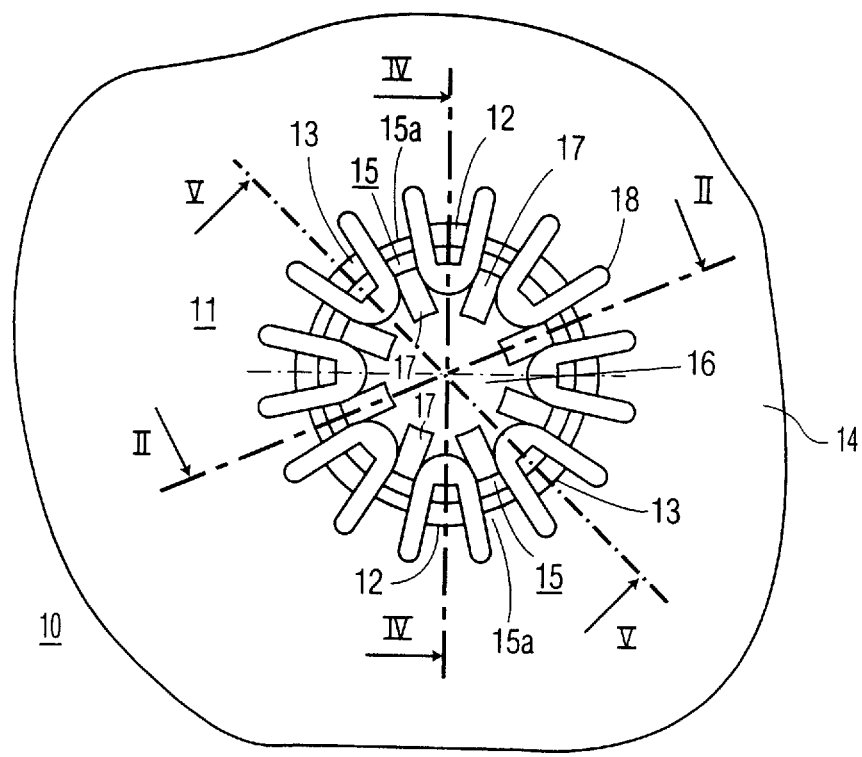
FIG. 1 is a plan view of a retaining device of the invention with a base plate constructed as a tray.

The tray 10 shown in part in FIG. 1 has a central retaining device 11 and is normally inserted into a bottom part of a housing (not shown), which is subsequently closed with a lid part. Such housings are commercially available and have been known for a long time. The retaining device 11 serves for positioning and clamping at least one CD. The retaining device of FIG. 1 in the present embodiment comprises eight clamping elements 12 and 13 which are distributed circularly along the circumference and which extend substantially at right angles to the plane 14 of the base plate 10. The clamping elements 12, 13 here serve to position and retain two disc-shaped information carriers (CDs), one lying above the other, and are provided with clamping surfaces of suitable shapes which face radially outwards, as will be described in more detail below with reference to FIGS. 4 and 5. Support studs 15 with support surfaces 15a facing radially outwards are present between the clamping elements 12, 13. The support surfaces 15a extend at right angles to the plane 14. The support studs 15 are fixedly and rigidly connected to one another by a common support element 16 which is constructed as a support plate in the present embodiment. Above the support plate 16 there are additional reinforcement ribs 17 for enhancing the strength of the support studs 15, of. FIG. 2. The support studs 15, the support plate 16, and the clamping elements 12, 13 form a single component. It may be manufactured from an originally approximately cup-shaped synthetic resin product which is subsequently interrupted by means of U-shaped incisions 18, whereby said radially resilient clamping studs 12, 13 are formed.

FIG. 3 shows an embodiment which is slightly modified compared with that of FIG. 2, the plate 16' being connected to the support studs 15' not in the central region thereof but at the extreme ends thereof. Additional reinforcement ribs 17' may be arranged below the support plate 16' in this embodiment, as is apparent from FIG. 3 of the drawing.

The clamping elements 12, 13 of FIG. 1 serve to position and retain two CDs 19, 20 lying one above the other and shown with dash-dot lines in FIGS. 4 and 5. FIG. 4 is a cross-section taken through the clamping elements 12 which serve to clamp the upper CD 19. FIG. 5 is a cross-section taken through the clamping elements 13 which serve to clamp the lower CD 20. The clamping elements 12, 13 are shown in the non-clamping state here and considerably enlarged, not true to scale.

The radially resilient clamping studs 12 of FIG. 4 have clamping surfaces 12a which taper conically towards the plane 14 of the tray 10 and surfaces 12b merging into the former surfaces 12a and extending at right angles to the plane 14. The clamping surfaces 12a serve to clamp the CD 19, whereas the surfaces 12b have no clamping function. The greatest outer diameter D1 of the clamping surfaces 12a is somewhat greater than the diameter 21a of the central CD opening 21 in the non-clamping state, i.e. without a CD 19 being inserted. The outer diameter D2 of the perpendicular surfaces 12b is a little smaller than the diameter 21a of the central opening 21.

In FIG. 5, the clamping studs 13 serve to clamp the lower CD 20. The clamping studs 13 have clamping surfaces 13a which adjoin the plane 14 of the tray 10 and which taper conically towards this plane 14. The maximum outer diameter D3 of the clamping surfaces 13a is somewhat greater than the diameter 21a of the central opening 21 in the non-clamping state. Above the clamping surfaces 13a there are perpendicular surfaces 13b whose diameter D4 is somewhat smaller than the diameter 21a of the central opening 21, so that these surfaces 13b do not interfere with the retention of the CD 20.

The outer diameter 15b of the support surfaces 15a of the support elements 15 (FIG. 2) is smaller than or at most as great as the diameter D2, D4 of the surfaces 12b, 13b of the clamping studs 12, 13 (FIGS. 4 and 5) which have no clamping function.

Figure 6:
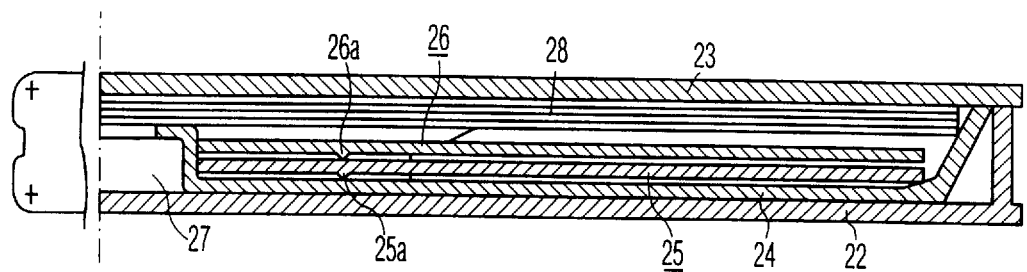
FIG. 6 is a lateral cross-sectional view of a housing of the invention for accommodating two CDs.

FIG. 6 is a cross-sectional lateral view of a housing for accommodating two CDs, the side on the left being shown only in part and not in cross-section. The housing has a bottom part 22, a lid part 23, and a tray 24 inserted into the bottom part and provided with a retaining device 27 for holding two CDs 25, 26, constructed in a manner according to the invention and not shown in any detail here. Raised rings are referenced 25a, 26a, and reference numeral 28 denotes a text booklet.

Figure 7:
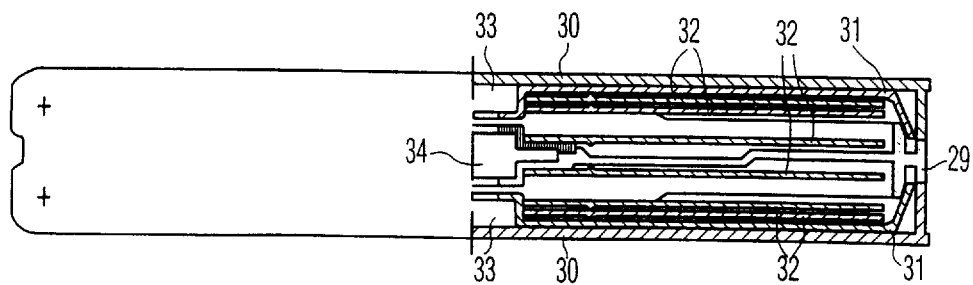
FIG. 7 is a cross-sectional view of a housing of the invention with a central part for accommodating six CDs.

FIG. 7 is a cross-sectional side view of a housing with a central part for accommodating six CDs, the left-hand portion of the housing being shown not in cross-section. This housing has a central part 29 and two identical lid parts 30 which are each provided with a tray 31 for accommodating two CDs 32 each. The central part supports two further CDs 32. The retaining devices 33, 34 of the two lid parts and of the central part 29 are constructed according to the invention and are not shown in any detail here.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A housing comprising:
   an enclosure:
   a base plate within the enclosure: and
   a retaining device which is arranged on the base plate, the retaining device includes:
   clamping studs which are arranged in a circle, which are radially resilient, and which have clamping surfaces facing radially outwards for gripping into a central opening of at least one planar disc-shaped information carrier, and
   rigid support studs with support surfaces facing radially outwards are provided between the clamping studs,
   and in which:
   the diameter of the rigid stud support surfaces arranged in a circle is approximately equal or somewhat smaller than a diameter of the central opening of the at least one information carrier; and
   the clamping studs include at least two structurally different groups of clamping studs.

2. A housing as claimed in claim 1, in which the support studs extend at right angles to a plane of the base plate and project approximately up to a free-end region of the clamping studs.

3. A housing as claimed in claim 1 in which the support studs are fixedly connected to one another by a common rigid support element.

4. A housing as claimed in claim 3, in which the support studs are connected in respective central regions to the common support element.

5. A housing as claimed in claim 3, in which the support studs are connected to the support element at their respective free ends.

6. A housing as claimed in claim 3, in which reinforcement ribs are provided at the connection points between the support element and the support studs.

7. A housing as claimed in claim 3, in which the support element is constructed as a support plate.

8. A housing as claimed in claim 3, in which the support element and the support studs are constructed integrally with the base plate.

9. A housing as claimed in claim 1, in which the enclosure includes: a bottom part, a lid part hinged to the bottom part, and the base plate is a tray which can be inserted into the bottom part and is mechanically captured in the bottom part.

10. The housing of claim 1, in which the structural difference between the two groups of clamping studs includes structurally different clamping surfaces.

11. The housing of claim 1, in which one group of clamping studs has clamping surfaces in one plane for clamping a first disk and another group has clamping surfaces in a different plane for clamping a second disk parallel to the first disk.

12. A housing as claimed in claim 11, in which:
   the clamping surfaces lying in their particular plane are constructed so as to taper towards a plane of the base plate, such that the greatest outer diameter of the clamping surfaces arranged in a circle is somewhat greater than the diameter of the central opening of the information carriers,
   the surfaces of the clamping studs adjoining the relevant clamping surfaces extend at right angles to the plane of the base plate and their outer diameter is somewhat smaller than the diameter of the central openings of the information carriers, and
   the diameter of the support surfaces is equal to or somewhat smaller than an outer diameter of the perpendicular surfaces of the clamping studs in the situation in which information carriers are being retained.

13. A housing for planar disks, comprising:
   a central part,
   two identical lid parts hinged to the central part, and
   a respective tray which can be inserted into each of the lid parts, the two trays each including;
   a base plate;
   a retaining device integral with the base plate, including:
   clamping studs arranged in a circle, radially resilient, and with clamping surfaces facing radially outwards for gripping central openings of multiple parallel disks, the clamping studs including multiple groups of clamping studs, each group defined by a structurally different clamping surface for gripping a respective disk;
   support studs arranged in the circle between the clamping studs, radially rigid, and connected to a common planar rigid support element.

14. The housing of claim 13, in which one group of clamping studs has clamping surfaces in one plane for clamping a first disk and another group has clamping surfaces in a different plane for clamping a second disk parallel to the first disk.

15. A housing for planar disks, comprising:
   a substantially transparent enclosure;
   a base plate within the enclosure;
   a retaining device integral with the base plate, including:
   clamping studs arranged in a circle, radially resilient, and with clamping surfaces facing radially outwards for gripping a central opening of a disk;
   support studs arranged in the circle between the clamping studs, radially rigid, and connected to a common planar rigid support element; and
   reinforcement ribs provided at the connections between the support element and the support studs, the ribs tapering to reduce material use.

16. The housing of claim 15, in which the clamping studs include at least two structurally different groups of clamping studs, one group having clamping surfaces in one plane for clamping a first disk and another group having clamping surfaces in a different plane for clamping a second disk parallel to the first disk.

17. A disk support device, comprising:

a base plate; and a retaining device integral with the base plate, the retaining device includes:

clamping studs which are arranged in a circle, which are radially resilient, and which have clamping surfaces facing radially outwards for gripping into a central opening of at least one planar disc-shaped information carrier, and rigid support studs with support surfaces facing radially outwards provided between the clamping studs, and in which:

the diameter of the rigid stud support surfaces arranged in a circle is approximately equal or somewhat smaller than a diameter of the central opening of the at least one information carrier; and the clamping studs include at least two structurally different groups of clamping studs.

18. The device of claim 17, in which one group of clamping studs has clamping surfaces in one plane for clamping a first disk and another group has clamping surfaces in a different plane for clamping a second disk parallel to the first disk.

* * * * *